(12) United States Patent
Files et al.

(10) Patent No.: US 11,645,181 B2
(45) Date of Patent: May 9, 2023

(54) AUTOMATED ISSUE DIRECTION AND REMEDIATION ACROSS MULTIPLE USER SYSTEMS USING HEALING-AS-A-SERVICE TECHNIQUES

(71) Applicant: Dell Products L.P., Round Rock, TX (US)

(72) Inventors: Jace W. Files, Round Rock, TX (US); Sathish Kumar Bikumala, Round Rock, TX (US); Selvadeepan Gunasekaran, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 17/381,629

(22) Filed: Jul. 21, 2021

(65) Prior Publication Data
US 2023/0022222 A1  Jan. 26, 2023

(51) Int. Cl.
| | |
|---|---|
| *G06F 11/30* | (2006.01) |
| *G06N 3/063* | (2023.01) |
| *G06N 3/08* | (2023.01) |
| *G06N 5/01* | (2023.01) |

(52) U.S. Cl.
CPC ...... *G06F 11/3051* (2013.01); *G06F 11/3006* (2013.01); *G06N 3/063* (2013.01); *G06N 3/08* (2013.01); *G06N 5/01* (2023.01)

(58) Field of Classification Search
CPC . G06F 11/3051; G05F 11/3006; G06N 3/063; G06N 3/08; G06N 5/003
See application file for complete search history.

(56) References Cited

U.S. PATENT DOCUMENTS

| | | | | |
|---|---|---|---|---|
| 9,304,796 | B1 * | 4/2016 | Douglas | G06F 11/0712 |
| 10,528,427 | B1 | 1/2020 | Kataki et al. | |
| 2008/0016017 | A1 * | 1/2008 | Biazetti | G06N 5/02 706/45 |
| 2012/0124410 | A1 | 5/2012 | Chun et al. | |
| 2015/0096011 | A1 * | 4/2015 | Watt | G06F 3/0647 726/15 |
| 2020/0081788 | A1 * | 3/2020 | Kataki | G06F 11/0712 |
| 2021/0273865 | A1 * | 9/2021 | Jing | H04L 43/10 |
| 2021/0279615 | A1 * | 9/2021 | Latapie | G06N 5/003 |

* cited by examiner

*Primary Examiner* — Jefferey F Harold
*Assistant Examiner* — Franklin S Andramuno
(74) *Attorney, Agent, or Firm* — Ryan, Mason & Lewis, LLP (57) ABSTRACT

Methods, apparatus, and processor-readable storage media for automated issue detection and remediation across multiple user systems using healing-as-a-service techniques are provided herein. An example computer-implemented method includes obtaining system configuration data from at least a portion of multiple user systems within a network; obtaining an alert pertaining to an issue attributed to a first of the user systems; training a machine learning model related to user system issue detection using at least a portion of the system configuration data and data related to the alert; determining user system configuration adjustments related to remedying at least a portion of the issue, by processing the data related to the alert using the trained machine learning model; automatically performing the user system configuration adjustments in connection with the first user system; and sharing, using at least one healing-as-a-service component, the trained machine learning model with the user systems in the network.

20 Claims, 6 Drawing Sheets

AUTOMATED ISSUE DIRECTION AND REMEDIATION ACROSS MULTIPLE USER SYSTEMS USING HEALING-AS-A-SERVICE TECHNIQUES

FIELD

The field relates generally to information processing systems, and more particularly to techniques for system management.

BACKGROUND

Enterprise users and/or other organizational users are increasingly working remotely. Within this paradigm, there is often an increased burden on information technology (IT) entities to remotely identify and remedy issues in user systems. Typically, user systems perform updates to their operating systems, security patches, firmware (e.g., BIOS), drivers, application software, background services, etc., in accordance with a static predetermined schedule. As such, the updates often occur on an isolated cadence without any knowledge of and/or consideration for complex relationships between the various software layers in the given system and/or across multiple connected systems. Consequently, incompatible software updates and/or patches may be installed which can cause system issues on a consistent basis and/or in connection with unanticipated corner cases. Additionally, with respect to remotely remedying such issues, conventional system management approaches often create latency problems due to processing large amounts of data, as well as security and/or data privacy problems related to accessing potentially sensitive portions of user data.

SUMMARY

Illustrative embodiments of the disclosure provide techniques for automated issue detection and remediation across multiple user systems using healing-as-a-service techniques. An exemplary computer-implemented method includes obtaining system configuration data from at least a portion of multiple user systems within a network, and obtaining at least one alert pertaining to at least one issue attributed to a first of the multiple user systems. The method also includes training at least one machine learning model related to user system issue detection using at least a portion of the obtained system configuration data and data related to the at least one alert, and determining one or more user system configuration adjustments related to remedying at least a portion of the at least one issue, by processing at least a portion of the data related to the at least one alert using the at least one trained machine learning model. Further, the method additionally includes automatically performing the one or more user system configuration adjustments in connection with the first user system, and sharing, using at least one healing-as-a-service component, the at least one trained machine learning model with at least a portion of the multiple user systems in the network.

Illustrative embodiments can provide significant advantages relative to conventional system management approaches. For example, problems associated with latency and data security are overcome in one or more embodiments through automated issue detection and configuration adjustment-based remediation across multiple user systems using healing-as-a-service techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
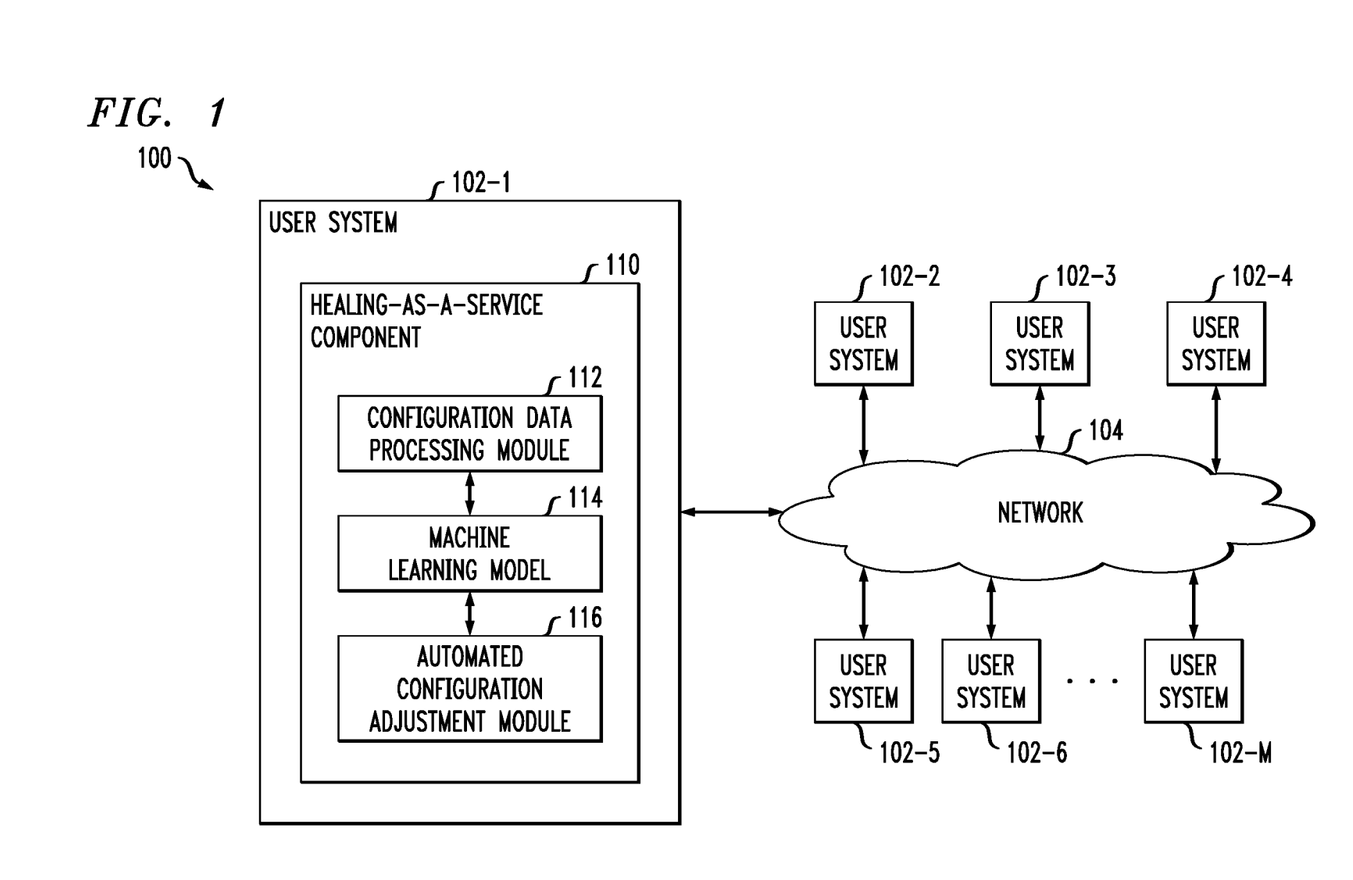
FIG. 1 shows an information processing system configured for automated issue detection and remediation across multiple user systems using healing-as-a-service techniques in an illustrative embodiment.

FIG. 1 shows a computer network (also referred to herein as an information processing system) 100 configured in accordance with an illustrative embodiment. The computer network 100 comprises a plurality of user systems 102-1, 102-2, 102-3, 102-4, 102-5, 102-6, . . . 102-M, collectively referred to herein as user systems 102. The user systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user systems 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user systems 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, user systems 102 can have one or more associated databases configured to store data pertaining to configuration parameters and other performance-related data pertaining to the given user systems.

Such a database in the present embodiment is implemented using one or more storage systems associated with user systems 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with user systems 102 can be one or more input-output devices, which illustratively comprise keyboards, displays or other types of input-output devices in any combination. Such input-output devices can be used, for example, to support one or more user interfaces to user systems 102, as well as to support communication between user systems 102 and other related systems and devices not explicitly shown.

Additionally, user systems 102 in the FIG. 1 embodiment are assumed to be implemented using at least one processing device. Each such processing device generally comprises at least one processor and an associated memory, and implements one or more functional modules for controlling certain features of user systems 102.

More particularly, user systems 102 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows each user system 102 to communicate over the network 104 with other user systems 102, and illustratively comprises one or more conventional transceivers.

As also depicted in FIG. 1 and further detailed herein, each user system 102 further comprises a healing-as-a-service component 110, which includes a configuration data processing module 112, a machine learning model 114, and an automated configuration adjustment module 116.

It is to be appreciated that this particular arrangement of elements 112, 114, and 116 illustrated in the healing-as-a-service component 110 of user systems 102 of the FIG. 1 embodiment is presented by way of example only, and alternative arrangements can be used in other embodiments. For example, the functionality associated with elements 112, 114, and 116 in other embodiments can be combined into a single module, or separated across a larger number of modules. As another example, multiple distinct processors can be used to implement different ones of elements 112, 114, and 116 or portions thereof.

At least portions of elements 112, 114, and 116 may be implemented at least in part in the form of software that is stored in memory and executed by a processor.

It is to be understood that the particular set of elements shown in FIG. 1 for automated issue detection and remediation across multiple user systems using healing-as-a-service techniques involving user systems 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing elements 112, 114, and 116 of an example user system 102 in computer network 100 will be described in more detail with reference to the flow diagram of FIG. 4.

Accordingly, at least one embodiment includes proactively remedying and/or preventing user system issues by replacing central data clusters and implementing peer-based healing-as-a-service techniques to in-network end point systems (also referred to herein as user systems). As detailed herein, with respect to healing being carried out at the network level, each system in a given network can raise an alert when the system encounters one or more issues and/or errors due, for example, to hardware incompatibilities, software bugs, bugs in the operating system kernel, firmware incompatibilities, versioning issues, faulty or poorly written device drivers, etc. Accordingly, one or more embodiments can include utilizing data related to such alerts (e.g., approximately real-time data) to implement healing-as-a-service techniques. Such an embodiment includes maintaining compliance with general data protection regulation (GDPR) because, for example, the data are not being shared data to a centralized data cluster or third-party entity. As also described herein, such an embodiment additionally includes limiting latency issues because, for example, each system collects and processes the relevant data, and immediately shares one or more corresponding insights across at least portions of the other network systems.

Accordingly, at least one embodiment includes implementing healing-as-a-service techniques which include comparing system profiles within a network for any deviations at the configuration level. If, for example, a security attack occurs at a given one of the network systems, such an attack would be identifiable, and that system could be isolated in order to determine and remedy the issue (e.g., update a security patch) and protect other systems in the network. Additionally, such an embodiment can include analyzing the configuration data of the affected system and developing at least one algorithm based thereon, wherein such an algorithm can be deployed to one or more of the other network systems through the healing-as-a-service model.

One or more embodiments include distributing such an algorithm across multiple systems, wherein the algorithm is trained to monitor, learn, and self-heal the given system, as well as to facilitate healing from and/or for similar issues in one or more other systems in the given network. Each such system includes and/or is provided a service which collects parameters such as, for example, thermal characteristics for various components (e.g., central processing unit (CPU), graphics processing unit (GPU), SSDs, Wi-Fi, etc.), usage information (e.g., usage related to CPU, memory, storage, wireless LAN (WLAN), etc.), system information (e.g., model number, configuration information, serial number, etc.), battery information, disk information, memory information, application information, driver information, power history, failure and/or alert logs, etc.

Additionally, such an embodiment also includes implementing healing as-a-service techniques on each system that monitors the state of such above-noted parameters. When, for example, a failure or alert is asserted on a given system, the corresponding healing as-a-service techniques analyzes at least a portion of the monitored parameters to determine a cause of the issue. If a cause is identified, parameter and/or configuration details corresponding thereto are shared with one or more of the other systems in the network as an input to a collective machine learning algorithm. An instance of the machine learning algorithm continuously learns and/or is trained, using such provided data, on each system (e.g., when the necessary system resources are available) and distributes any new findings to the other systems participating in the network. By way merely of example, in one or more embodiments, the algorithm runs when one or more changes are detected that may impact performance and/or stability of the given system.

Additionally, as illustrated in FIG. 1 and further described herein, at least one embodiment includes implementing one or more distribution models such that a version of the same machine learning model is running in each user system in the network. Such an embodiment can include using a query flooding distribution model, wherein the peers (i.e., the user systems) are connected into an overlay network. Accordingly, by way of example, when one peer requests data, the request is sent to all neighboring nodes (i.e., user systems/peers) which are connected in the given network, and data are collected by and/or from each such node.

As also detailed herein (e.g., in connection with FIG. 2, as detailed below) one or more embodiments include implementing failure detection techniques. Such an embodiment includes using one or more machine learning algorithms trained to detect particular problems and/or problem types. For example, such an embodiment can include using a decision tree algorithm to predict the probability of a given alert based on system alert information (wherein the use of such system alert information can facilitate a determination of whether a given alert is critical or informational). If the alert is deemed critical, then the machine learning algorithm will check the component(s) and/or software associated with the alert (e.g., BIOS-related, driver-related, software-related, hardware-related, operating system (OS)-related, etc.) and identify and/or determine any recent changes that may be related to the alert (and/or could be correlated across multiple systems).

Figure 2:
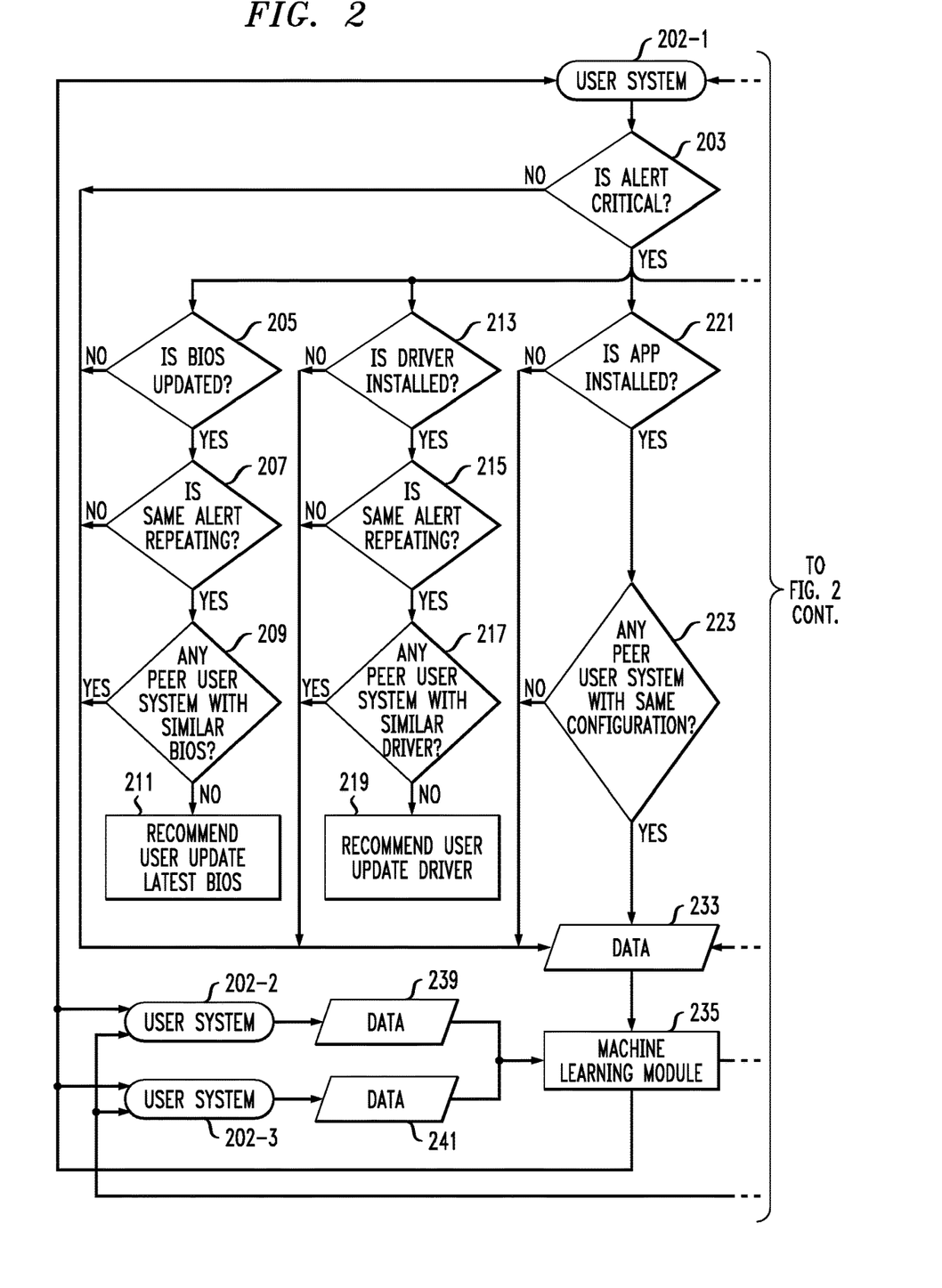
FIG. 2 shows an example flow diagram for detecting one or more system problems using machine learning techniques in an illustrative embodiment.

FIG. 2 shows an example flow diagram for detecting one or more system problems using machine learning techniques in an illustrative embodiment. As further specified below, FIG. 2 depicts a flow diagram pertaining to problem detection that includes using a decision tree algorithm to identify the problem(s), using a separate machine learning algorithm to recommend one or more configuration updates, and sending an updated version of the machine learning algorithm to peer systems to detect and/or recommend similar configuration adjustments in one or more of the peer systems. As further detailed below, the peer user systems in the example of FIG. 2 illustratively include three systems denoted 202-1, 202-2 and 202-3, but it is to be appreciated that other embodiments can include different numbers and/or arrangements of peer user systems.

Specifically, FIG. 2 depicts user system 202-1, which receives and/or observes an alert, and determines in step 203 if the alert is critical. In such an embodiment, this determination can be carried out based at least in part on data collected from the user system and one or more peer user systems, wherein such data are used to train a machine learning algorithm. The trained machine learning algorithm processes the alert and determines a level of criticality associated therewith. If the alert is not deemed to be critical in step 203, then data pertaining to that determination is incorporated into and/or added to data 233. If the alert is deemed to be critical in step 203, then the machine learning algorithm makes more granular determinations in steps 205, 213, 221, 225, and/or 229.

For example, in step 205, it is determined whether the critical alert is related to a BIOS update. If yes, then step 207 includes determining if the same alert is repeating. If no (i.e., the alert is not related to a BIOS update), then data pertaining to that determination is incorporated into and/or added to data 233. If the alert is repeating, step 209 includes determining if there is any peer user system (e.g., user system 202-2 and/or user system 202-3) with similar BIOS to user system 202-1. If the alert is deemed not to be repeating, then data pertaining to that determination is incorporated into and/or added to data 233. If one or more of the peer systems (e.g., user system 202-2 and/or user system 202-3) are determined to have similar BIOS (to user system 202-1) in step 209, then data pertaining to that determination is incorporated into and/or added to data 233. If no peer system is determined to have similar BIOS (to user system 202-1), then step 211 includes outputting a recommendation to user system 202-1 to update one or more BIOS configurations (in accordance with the BIOS configurations of user system 202-2 and/or user system 202-3 (e.g., the latest BIOS version)).

Additionally or alternatively, in step 213, it is determined whether the critical alert is related to an installed driver. If no, then data pertaining to that determination is incorporated into and/or added to data 233. If yes, then step 215 includes determining if the same alert is repeating. If the alert is repeating, step 217 includes determining whether user system 202-2 and/or user system 202-3 have a similar driver (to user system 202-1) installed. If the alert is deemed not to be repeating, then data pertaining to that determination is incorporated into and/or added to data 233. If one or more of the peer systems (e.g., user system 202-2 and/or user system 202-3) are determined to have a similar driver (to user system 202-1), then data pertaining to that determination is incorporated into and/or added to data 233. If no peer system is determined to have a similar driver (to user system 202-1), then step 219 includes outputting a recommendation to user system 202-1 to update one or more driver configurations (in accordance with the driver configurations of user system 202-2 and/or user system 202-3).

Additionally or alternatively, in step 221, it is determined whether the critical alert is related to an installed application. If no, then data pertaining to that determination is incorporated into and/or added to data 233. If yes, then step 223 includes determining whether user system 202-2 and/or user system 202-3 have a similar application (to user system 202-1) installed and/or whether the installed application is similarly configured (to that of user system 202-1). If yes, then data pertaining to that (positive) determination is incorporated into and/or added to data 233. If no, then (different) data pertaining to that (negative) determination is incorporated into and/or added to data 233.

Similarly, in step 225, it is determined whether the critical alert is related to one or more hardware changes. If no, then data pertaining to that determination is incorporated into and/or added to data 233. If yes, then step 227 includes determining whether user system 202-2 and/or user system 202-3 have similar hardware changes (to user system 202-1) and/or whether the hardware is similarly configured (to that of user system 202-1). If yes, then data pertaining to that (positive) determination is incorporated into and/or added to data 233. If no, then (different) data pertaining to that (negative) determination is incorporated into and/or added to data 233. Additionally or alternatively, in step 229, it is determined whether the critical alert is related to system usage. If no, then data pertaining to that determination is incorporated into and/or added to data 233. If yes, then step 231 includes determining whether user system 202-2 and/or user system 202-3 have similar system usage configurations (to user system 202-1). If yes, then data pertaining to that (positive) determination is incorporated into and/or added to data 233. If no, then (different) data pertaining to that (negative) determination is incorporated into and/or added to data 233.

As also illustrated in FIG. 2, compiled data 233, as well as data 239 and data 241 (from user system 202-2 and user system 202-3, respectively) are used to further train the machine learning model 235. As also depicted in FIG. 2, the trained machine learning model 235 will be shared and distributed to other peer systems (such as user system 202-2 and user system 202-3) to increase the predictive accuracy and efficiency of the ecosystem. Additionally, in conjunction with the above-noted descriptions, at least one recommendation 237 pertaining to the alert received by user system 202-1 is generated by the trained machine learning model 235 and provided to user system 202-1, as well as to user system 202-2 and user system 202-3 for implementation (e.g., the recommendation 237 can include an instruction to adjust one or more system configurations).

Also in one or more embodiments, if particular system configurations, system profiles, and/or system workloads are the same or different across peer user systems, and an alert raised in one such system cannot be determined (e.g., by a decision tree model) to be associated with a particular component and/or configuration thereof, then the alert details and related system configuration details (including peer user system data) can be sent to a deep learning model which uses cognitive computing that helps in building machines capable of using self-learning algorithms.

Figure 3:
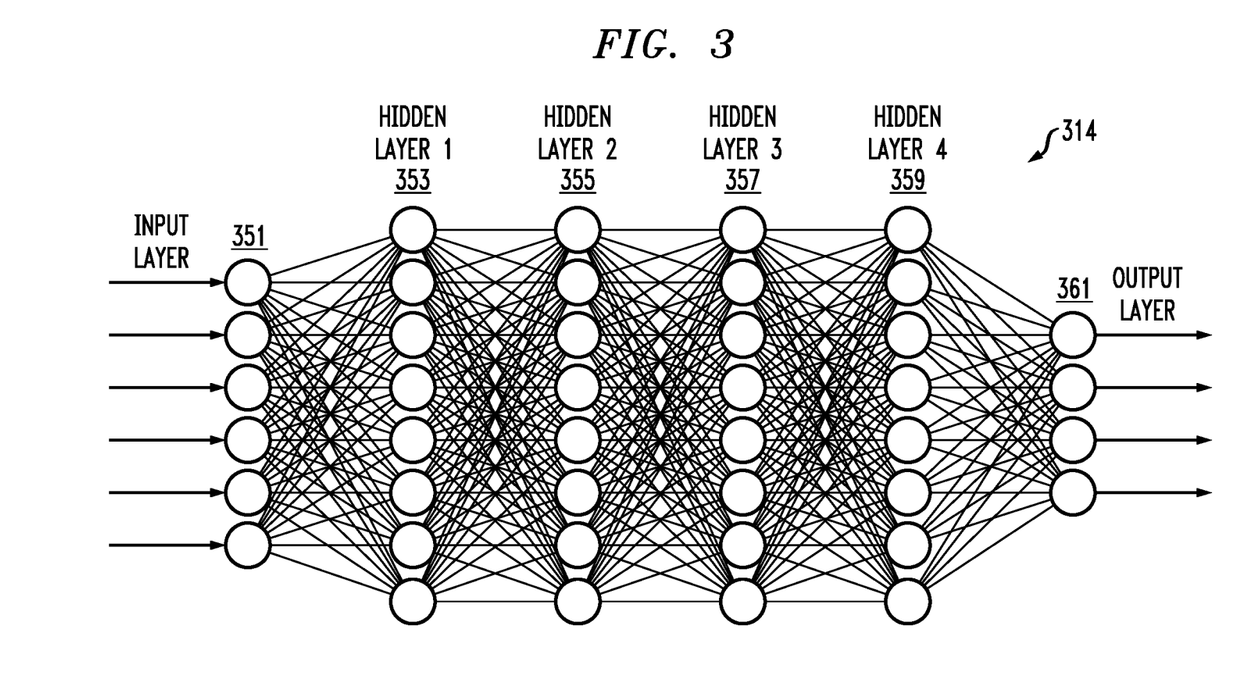
FIG. 3 shows an example neural network implemented in an illustrative embodiment.

FIG. 3 shows an example neural network 314 implemented in an illustrative embodiment. As depicted, data flows through various deep learning hidden layers to identify and/or predict a given system problem. Specifically, neural network 314 includes an input layer 351 (for initially processing data related to a given alert), followed by hidden layer 353, which identifies the area(s) from where the alert was generated. Subsequently, hidden layer 355 processes and/or identifies critical alert details (determined, for example, via one or more deep learning techniques), hidden layer 357 processes and/or determines peer system configuration details, hidden layer 359 determines the frequency of the alert, and based on these layers of data processing, a system problem prediction and/or identification is generated via output layer 361.

Accordingly, at least one embodiment includes passing alert-related data through different hidden layers, enabling the given neural network to utilize cognitive computing and to learn from patterns of authorized behavior, thereby facilitating the neural network's ability to distinguish between alerts and potential configuration adjustments related thereto. Additionally, outputs determined by such a neural network can also be used to train at least one machine learning model shared across the user systems (such as, for example, detailed in connection with FIG. 2).

In at least one embodiment, a healing-as-a-service component, along with a corresponding configuration file, can be implemented in connection with each of multiple user systems within a given network and/or ecosystem. Such a configuration file can include details such as, for example, configuration file version, data collection path(s), processing details, various machine learning algorithm details, machine learning model versions, etc. The healing-as-a-service component can include coordinating data collection across the user systems of the network (e.g., using one or more data collection applications installed on the various user systems). Once the data are collected, the healing-as-a-service component starts to process the data, which can include data cleaning, data mining, data joining, and/or data formatting. Using the processed data, the healing-as-a-service component compares at least portions of the data across the peer user systems. Based at least in part on such comparisons, the healing-as-a-service component triggers a process of training a machine learning algorithm to produce a machine learning model for predicting and/or identifying one or more system issues.

Accordingly, and as further detailed herein, a healing-as-a-service component can manage an end-to-end process of data collection to machine learning model generation, and the machine learning model, which executes internally within each user system, determines system profile information and/or internal configuration changes pertaining to hardware, software, firmware, etc.

In one or more embodiments, whenever at least a portion of the user systems associated with a given network are connected in the network, at least one machine learning model is trained and/or retrained using combined data from the user systems based, for example, on the availability of system resources (e.g., resources from across the user systems operating at that moment (such as CPU, memory, network, etc.) and/or resources which can be defined in the configuration file associated with the healing-as-a-service component). Subsequently, the updated machine learning model version details are incorporated into the configuration file by the healing-as-a-service component, which also shares the updated machine learning model to other peer user systems (other systems from the system that initiated the training and/or retraining of the machine learning model). Additionally or alternatively, other peer systems can be configured to check other user systems within the network (for example, at a given frequency) for an updated version of the machine learning model. In such an embodiment, if the machine learning model version is higher in a peer system, then the given user system downloads, from that peer system, the higher version of the machine learning model and implements the model internally to predict and/or identify a given problem (and, if required, automatically adjust one or more system configurations as a remedy).

It is also to be appreciated that user systems do not always intend to connect to a given network at a given time and/or at a given temporal frequency. In such a scenario, every time the user system connects to the network, the user system's healing-as-a-service component shares data to one or more peer systems within the network, along with the latest version of the user system's system profile, and downloads the latest machine learning model version, if different from the system's existing version, from the nearest (connected) peer system in the network. Upon downloading the latest version of the machine learning model, the model, internally, starts to predict and/or identify at least one given problem (and, if required, automatically adjust one or more system configurations as a remedy). When the given user system is not connected to the network for a given period of time, the existing version of the machine learning model internal to the user system learns data from its own system, retrains the model using such data, and carries out one or more self-healing operations, as necessary. In such a scenario, when the user system connects back to the network, the system shares its latest data with the other peer user systems across the network and retrains the machine learning model based at least in part on available system resources.

By way merely of illustration, consider an example scenario wherein a network user system (User1) connects to the network. Additionally, User2 system resources are available to trigger the healing-as-a-service component of User1 to collect such peer system data, process at least a portion of such collected data, and use at least a portion of the processed data to train a machine learning model for predicting and/or identifying one or more system configuration issues, as well as recommending one or more corresponding system configuration adjustments as remediation. The trained machine learning model is then made available (from User1) to User2 for User2 to use internally to predict and/or identify the one or more system issues, and, if necessary, initiate the one or more corresponding system configuration adjustments. User1 and/or User2 can also share the trained machine learning model with other peer user systems in the network.

By way of further illustration, consider another example scenario wherein a new user system (User4) is attempting to connect into the network using its healing-as-a-service component, which turns to connect the user system from the nearest peer user system, User3. User3 shares its version of the machine learning model to new user system User4. At this point, new user system User4 is ready to internally execute the machine learning model to predict and/or identify the one or more system issues, and, if necessary, initiate the one or more corresponding system configuration adjustments. Further assume that User3 observes a critical alert, which is then shared into the network. Once the corresponding data are shared into the network, and based on the availability of system resources, the machine learning model can be retrained using the given instructions in the configuration file, which is available internally on each user system internally. The retrained machine learning model can then be shared with one or more (e.g., nearest) peer user systems. Also, such a cycle and/or sequence can be carried out whenever a new dataset and/or critical alert is asserted in a given one of the user systems in the network.

Accordingly, in one or more embodiments, each user system within a given network is configured to check with healthy peer systems for existing machine learning model versions (including recommendations for related automated configuration adjustments). As detailed herein, such a machine learning model (e.g., a decision tree machine learning model) tracks system configuration differences, identifies which differences show a pattern correlated with a predicted and/or identified issue and/or error, and initiates updates to relevant system configurations automatically. In at least one embodiment, such a machine learning model can also provide insights to detect and correct identical workloads.

As also detailed herein, in certain instances, a decision tree algorithm can be utilized in connection with anomaly detection techniques to continuously analyze user system data to discover one or more anomalies and/or variations, and derive insights therefrom to detect and correct at least one non-identical workload. By way of further example, consider scenarios wherein blue screen of death (B SOD) occurs and repeats at a regular interval in one or more user systems within a network. In such a scenario, one or more embodiments can include implementing long short-term memory (LSTM) networks and gated recurrent units (GRU) networks to regulate the flow of information to help the algorithm learn, keeping only relevant information to generate predictions.

Additionally, at least one embodiment includes processing data related to hardware profiles, device health metrics, and performance metrics for similarly configured hardware devices before accepting and/or implementing a trained machine learning model recommendation. Such processing includes ensuring that the correct and/or appropriate data are being utilized, protecting the device(s) from any unwanted events occurring, and securely utilizing peer-to-peer distributed learning in the given network.

Figure 4:
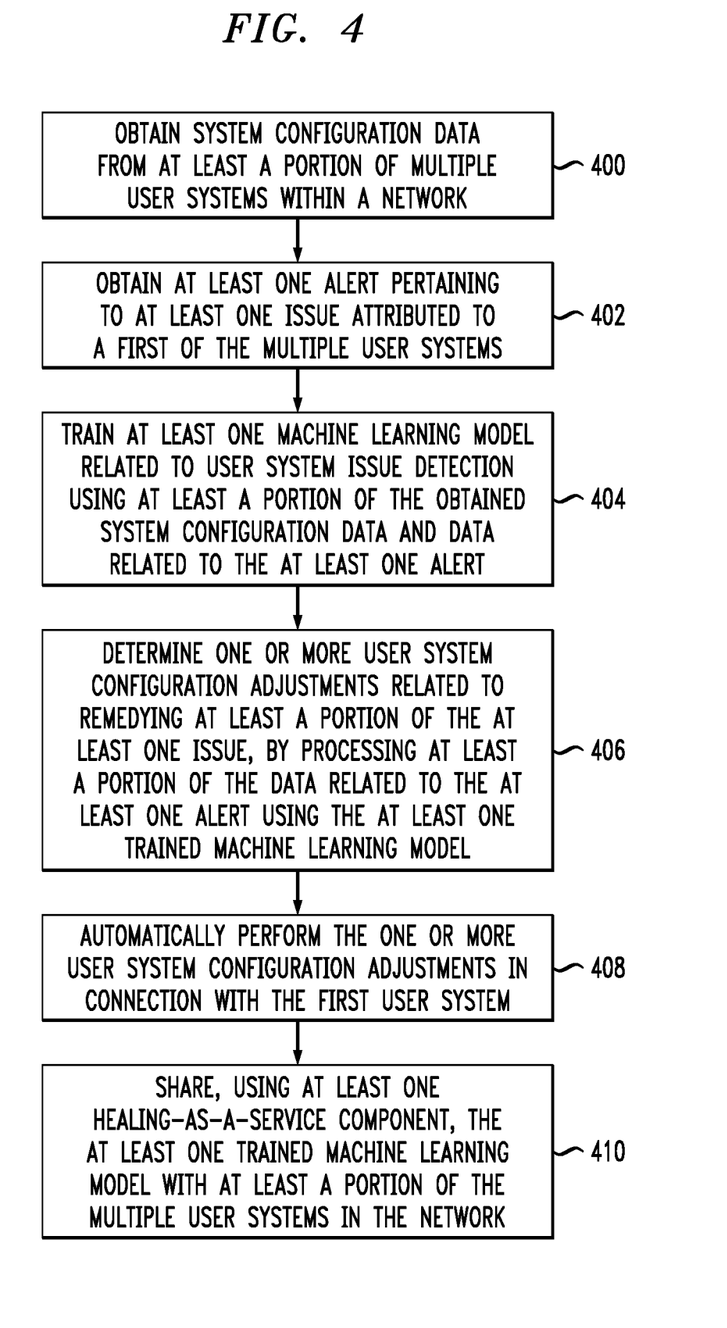
FIG. 4 is a flow diagram of a process for automated issue detection and remediation across multiple user systems using healing-as-a-service techniques in an illustrative embodiment.

FIG. 4 is a flow diagram of a process for automated issue detection and remediation across multiple user systems using healing-as-a-service techniques in an illustrative embodiment. It is to be understood that this particular process is only an example, and additional or alternative processes can be carried out in other embodiments.

In this embodiment, the process includes steps 400 through 410. These steps are assumed to be performed by an example user system 102 utilizing elements 112, 114, and 116.

Step 400 includes obtaining system configuration data from at least a portion of multiple user systems within a network. In at least one embodiment, obtaining the system configuration data includes obtaining, from the at least a portion of the multiple user systems within the network, data pertaining to one or more of thermal characteristics of one or more hardware components, one or more usage metrics, user system information, battery information, disk information, memory information, application information, driver information, power history information, and one or more alert logs. Step 402 includes obtaining at least one alert pertaining to at least one issue attributed to a first of the multiple user systems.

Step 404 includes training at least one machine learning model related to user system issue detection using at least a portion of the obtained system configuration data and data related to the at least one alert. In at least one embodiment, the at least one machine learning model includes at least one decision tree model. Additionally, in one or more embodiments, training the at least one machine learning model includes processing at least a portion of the obtained system configuration data and data related to the at least one alert using a neural network, wherein the neural network comprises multiple hidden layers, and training the at least one machine learning model using at least a portion of an output of the neural network. By way of example, the multiple hidden layers can include at least one hidden layer which identifies at least one area from which the at least one alert was generated, at least one hidden layer which processes one or more details of the at least one alert, at least one hidden layer which processes one or more configuration-related details attributed to the at least a portion of multiple user systems within the network, and/or at least one hidden layer which determines frequency information pertaining to the at least one alert. Additionally or alternatively, training the at least one machine learning model can include identifying one or more deviations at a user system configuration level by comparing system configuration data, from among the obtained system configuration data, associated with two or more of the multiple user systems.

Step 406 includes determining one or more user system configuration adjustments related to remedying at least a portion of the at least one issue, by processing at least a portion of the data related to the at least one alert using the at least one trained machine learning model. Step 408 includes automatically performing the one or more user system configuration adjustments in connection with the first user system.

Step 410 includes sharing, using at least one healing-as-a-service component, the at least one trained machine learning model with at least a portion of the multiple user systems in the network. In at least one embodiment, sharing the at least one trained machine learning model includes sharing, using a respective healing-as-a-service component resident on each of the multiple user systems in the network, the at least one trained machine learning model with all of the multiple user systems in the network. Additionally or alternatively, in one or more embodiments, sharing the at least one trained machine learning model can include using a query flooding distribution model in connection with the network, wherein the multiple user systems are connected into an overlay network.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically detect and remediate issues across multiple user systems using healing-as-a-service techniques. These and other embodiments can effectively overcome problems associated with latency and data security.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
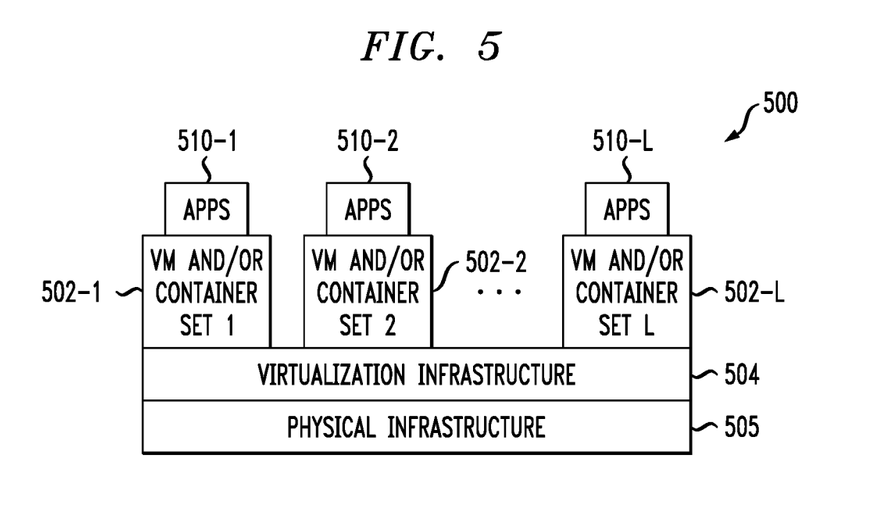
FIGS. 5 and 6 show examples of processing platforms that may be utilized to implement at least a portion of an information processing system in illustrative embodiments.
Figure 6:
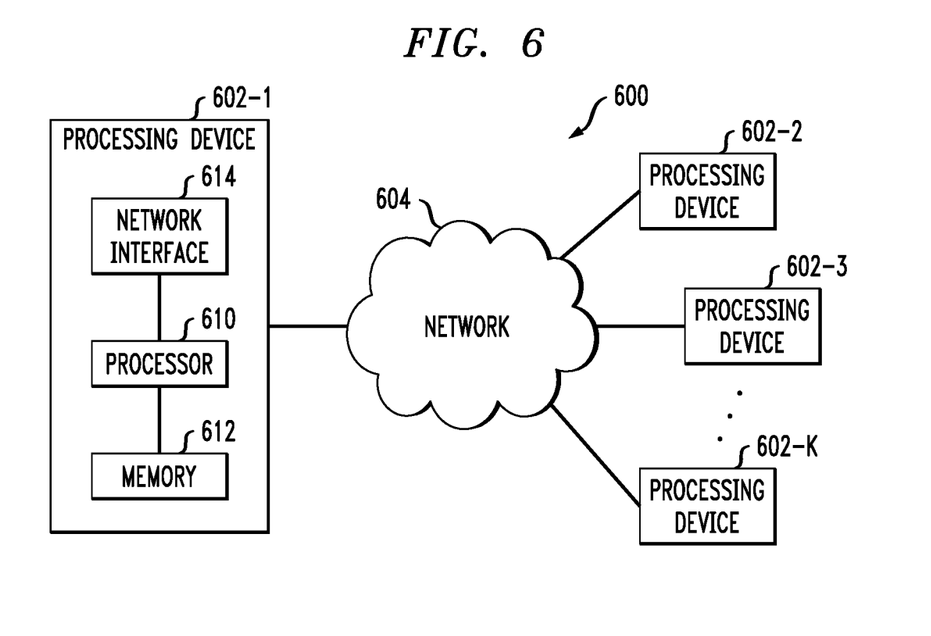

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining system configuration data from at least a portion of multiple user systems within a network;
obtaining alert data pertaining to at least one issue attributed to at least a first one of the multiple user systems;
training at least one machine learning model related to user system issue detection using at least a portion of the system configuration data and at least a portion of the alert data, wherein training the at least one machine learning model comprises processing the at least a portion of the system configuration data and the at least a portion of the alert data using at least one neural network, wherein the at least one neural network comprises multiple hidden layers comprising at least one hidden layer which processes one or more features of at least one alert characterized by the alert data;
determining one or more user system configuration adjustments related to remedying at least a portion of the at least one issue, by processing at least a portion of the alert data using the at least one trained machine learning model;
automatically performing the one or more user system configuration adjustments in connection with the first one of the multiple user systems; and
sharing, using at least one healing-as-a-service component, the at least one trained machine learning model with at least a portion of the multiple user systems in the network;
wherein the method is performed by at least one processing device comprising a processor coupled to a memory.

2. The computer-implemented method of claim 1, wherein the at least one machine learning model comprises at least one decision tree model.

3. The computer-implemented method of claim 1, wherein training the at least one machine learning model comprises:
training the at least one machine learning model using at least a portion of an output of the at least one neural network.

4. The computer-implemented method of claim 1, wherein the multiple hidden layers comprise at least one hidden layer which identifies at least one area from which the at least one alert was generated.

5. The computer-implemented method of claim 1, wherein the multiple hidden layers comprise at least one hidden layer which processes one or more configuration-related details attributed to the at least a portion of multiple user systems within the network.

6. The computer-implemented method of claim 1, wherein the multiple hidden layers comprise at least one hidden layer which determines frequency information pertaining to the at least one alert.

7. The computer-implemented method of claim 1, wherein sharing the at least one trained machine learning model comprises sharing, using a respective healing-as-a-service component resident on each of the multiple user systems in the network, the at least one trained machine learning model with all of the multiple user systems in the network.

8. The computer-implemented method of claim 1, wherein sharing the at least one trained machine learning model comprises using a query flooding distribution model in connection with the network, wherein the multiple user systems are connected into an overlay network.

9. The computer-implemented method of claim 1, wherein training the at least one machine learning model comprises identifying one or more deviations at a user system configuration level by comparing system configuration data, from among the system configuration data, associated with two or more of the multiple user systems.

10. The computer-implemented method of claim 1, wherein obtaining the system configuration data comprises obtaining, from the at least a portion of the multiple user systems within the network, data pertaining to one or more of thermal characteristics of one or more hardware components, one or more usage metrics, user system information, battery information, disk information, memory information, application information, driver information, power history information, and one or more alert logs.

11. A non-transitory processor-readable storage medium having stored therein program code of one or more software programs, wherein the program code when executed by at least one processing device causes the at least one processing device:
to obtain system configuration data from at least a portion of multiple user systems within a network;
to obtain alert data pertaining to at least one issue attributed to at least a first one of the multiple user systems;
to train at least one machine learning model related to user system issue detection using at least a portion of the system configuration data and at least a portion of the alert data, wherein training the at least one machine learning model comprises processing the at least a portion of the system configuration data and the at least a portion of the alert data using at least one neural network, wherein the at least one neural network comprises multiple hidden layers comprising at least one hidden layer which processes one or more features of at least one alert characterized by the alert data;
to determine one or more user system configuration adjustments related to remedying at least a portion of the at least one issue, by processing at least a portion of the alert data using the at least one trained machine learning model;
to automatically perform the one or more user system configuration adjustments in connection with the first one of the multiple user systems; and
to share, using at least one healing-as-a-service component, the at least one trained machine learning model with at least a portion of the multiple user systems in the network.

12. The non-transitory processor-readable storage medium of claim 11, wherein the at least one machine learning model comprises at least one decision tree model.

13. The non-transitory processor-readable storage medium of claim 11, wherein training the at least one machine learning model comprises:
training the at least one machine learning model using at least a portion of an output of the at least one neural network.

14. The non-transitory processor-readable storage medium of claim 11, wherein sharing the at least one trained machine learning model comprises sharing, using a respective healing-as-a-service component resident on each of the multiple user systems in the network, the at least one trained machine learning model with all of the multiple user systems in the network.

15. The non-transitory processor-readable storage medium of claim 11, wherein sharing the at least one trained machine learning model comprises using a query flooding distribution model in connection with the network, wherein the multiple user systems are connected into an overlay network.

16. An apparatus comprising:
at least one processing device comprising a processor coupled to a memory;
the at least one processing device being configured:
to obtain system configuration data from at least a portion of multiple user systems within a network;
to obtain alert data pertaining to at least one issue attributed to at least a first one of the multiple user systems;
to train at least one machine learning model related to user system issue detection using at least a portion of the system configuration data and at least a portion of the alert data, wherein training the at least one machine learning model comprises processing the at least a portion of the system configuration data and the at least a portion of the alert data using at least one neural network, wherein the at least one neural network comprises multiple hidden layers comprising at least one hidden layer which processes one or more features of at least one alert characterized by the alert data;
to determine one or more user system configuration adjustments related to remedying at least a portion of the at least one issue, by processing at least a portion of the alert data using the at least one trained machine learning model;
to automatically perform the one or more user system configuration adjustments in connection with the first one of the multiple user systems; and
to share, using at least one healing-as-a-service component, the at least one trained machine learning model with at least a portion of the multiple user systems in the network.

17. The apparatus of claim 16, wherein the at least one machine learning model comprises at least one decision tree model.

18. The apparatus of claim 16, wherein training the at least one machine learning model comprises:
training the at least one machine learning model using at least a portion of an output of the at least one neural network.

19. The apparatus of claim 16, wherein sharing the at least one trained machine learning model comprises sharing, using a respective healing-as-a-service component resident on each of the multiple user systems in the network, the at least one trained machine learning model with all of the multiple user systems in the network.

20. The apparatus of claim 16, wherein sharing the at least one trained machine learning model comprises using a query flooding distribution model in connection with the network, wherein the multiple user systems are connected into an overlay network.

* * * * *

UNITED STATES PATENT AND TRADEMARK OFFICE
CERTIFICATE OF CORRECTION

| | | |
|---|---|---|
| PATENT NO. | : 11,645,181 B2 | Page 1 of 1 |
| APPLICATION NO. | : 17/381629 | |
| DATED | : May 9, 2023 | |
| INVENTOR(S) | : Jace W. Files et al. | |

It is certified that error appears in the above-identified patent and that said Letters Patent is hereby corrected as shown below:

On the Title Page

Item (54) and in the Specification, Column 1, Line 1, replace:
"AUTOMATED ISSUE DIRECTION AND REMEDIATION ACROSS MULTIPLE USER SYSTEMS USING HEALING-AS-A-SERVICE TECHNIQUES"
With:
-- AUTOMATED ISSUE DETECTION AND REMEDIATION ACROSS MULTIPLE USER SYSTEMS USING HEALING-AS-A-SERVICE TECHNIQUES --

Signed and Sealed this
Twenty-sixth Day of December, 2023

Katherine Kelly Vidal
*Director of the United States Patent and Trademark Office*